J. C. CROMWELL.
GANG HACK SAWING MACHINE.
APPLICATION FILED JULY 17, 1915.
1,186,287.
Patented June 6, 1916.
7 SHEETS—SHEET 5.
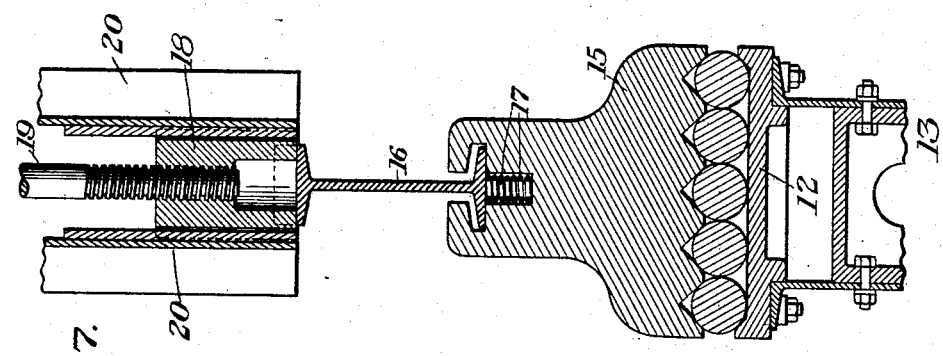
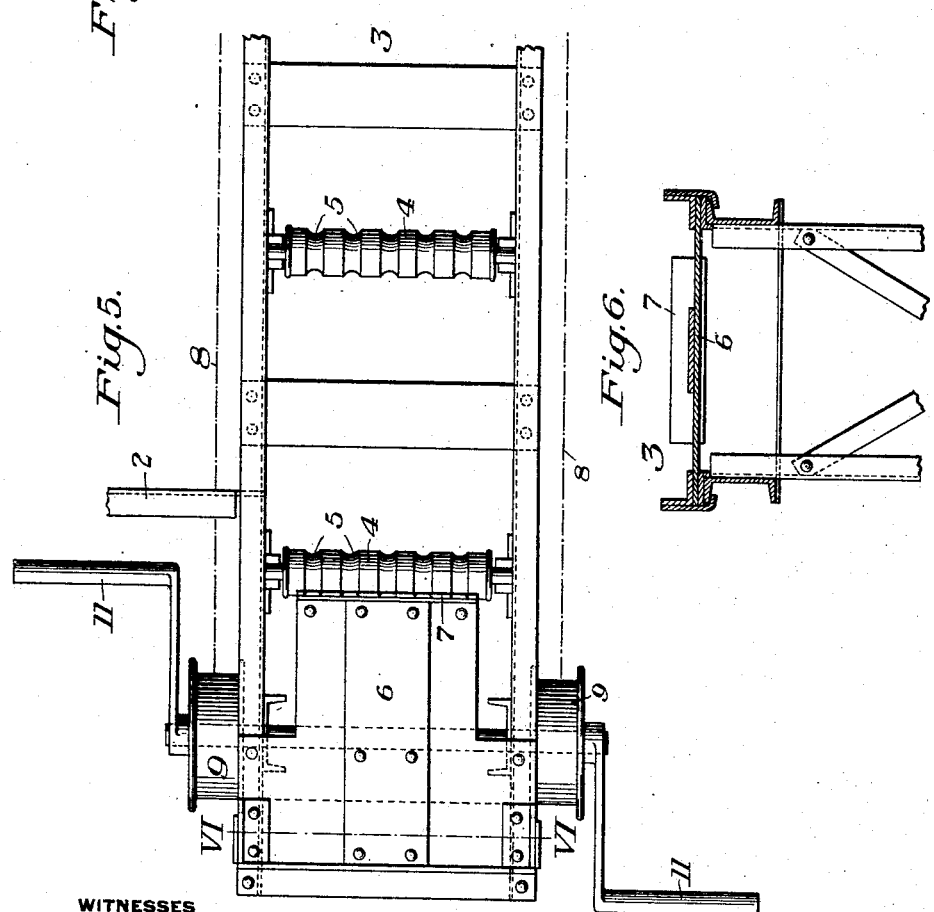
WITNESSES
R H Balderson
G. B. Behning
INVENTOR
Jno. C. Cromwell,
by Bakewell, Byrnes Parmelee
Attys.

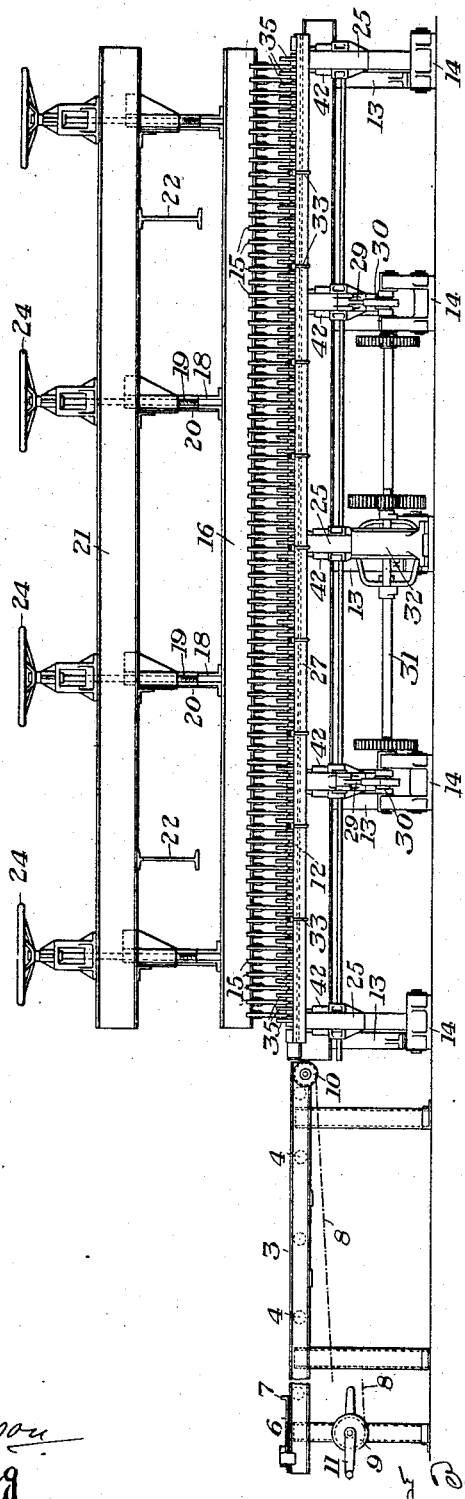

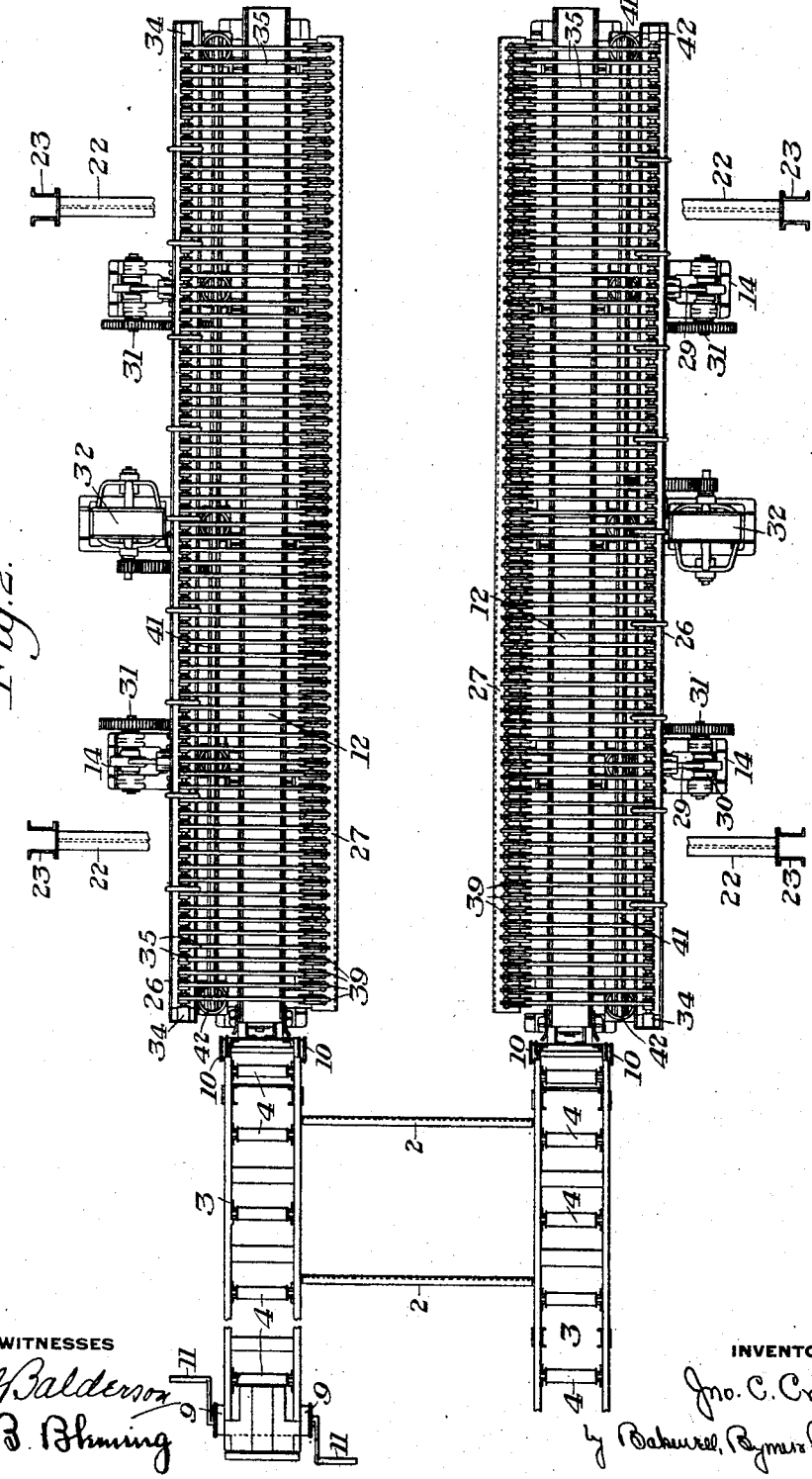

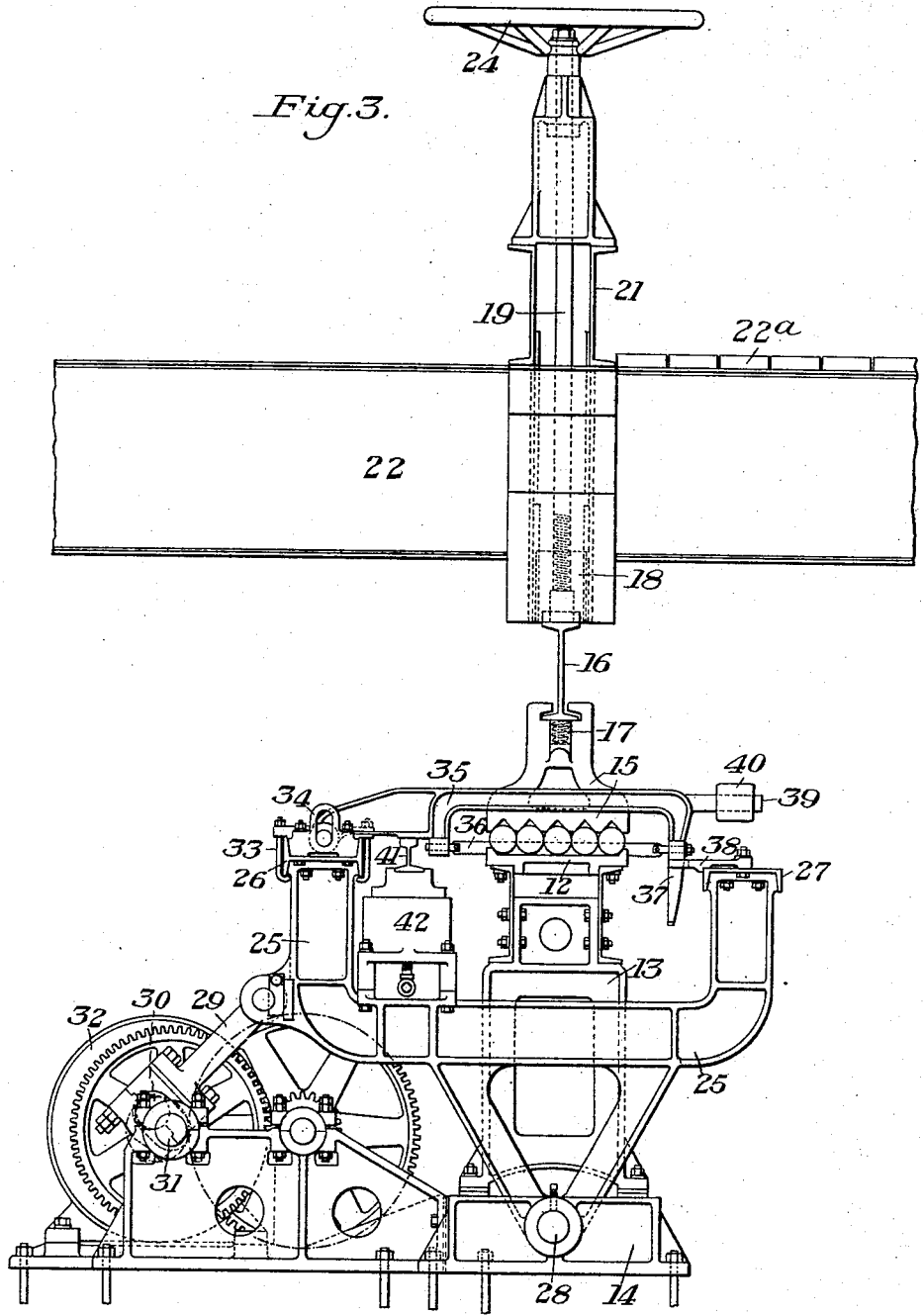

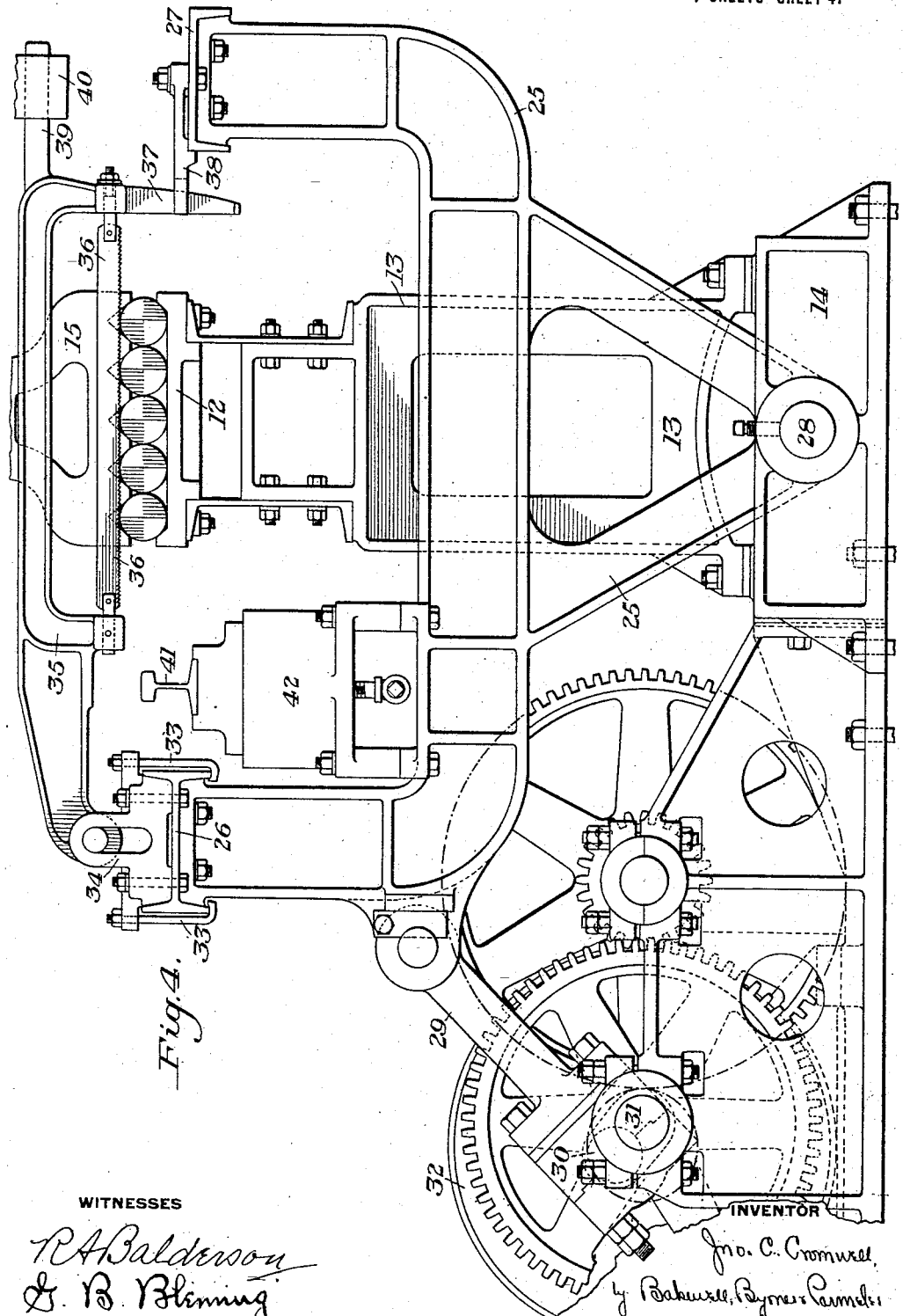

J. C. CROMWELL.
GANG HACK SAWING MACHINE.
APPLICATION FILED JULY 17, 1915.

1,186,287. Patented June 6, 1916.
7 SHEETS—SHEET 6.

WITNESSES
INVENTOR

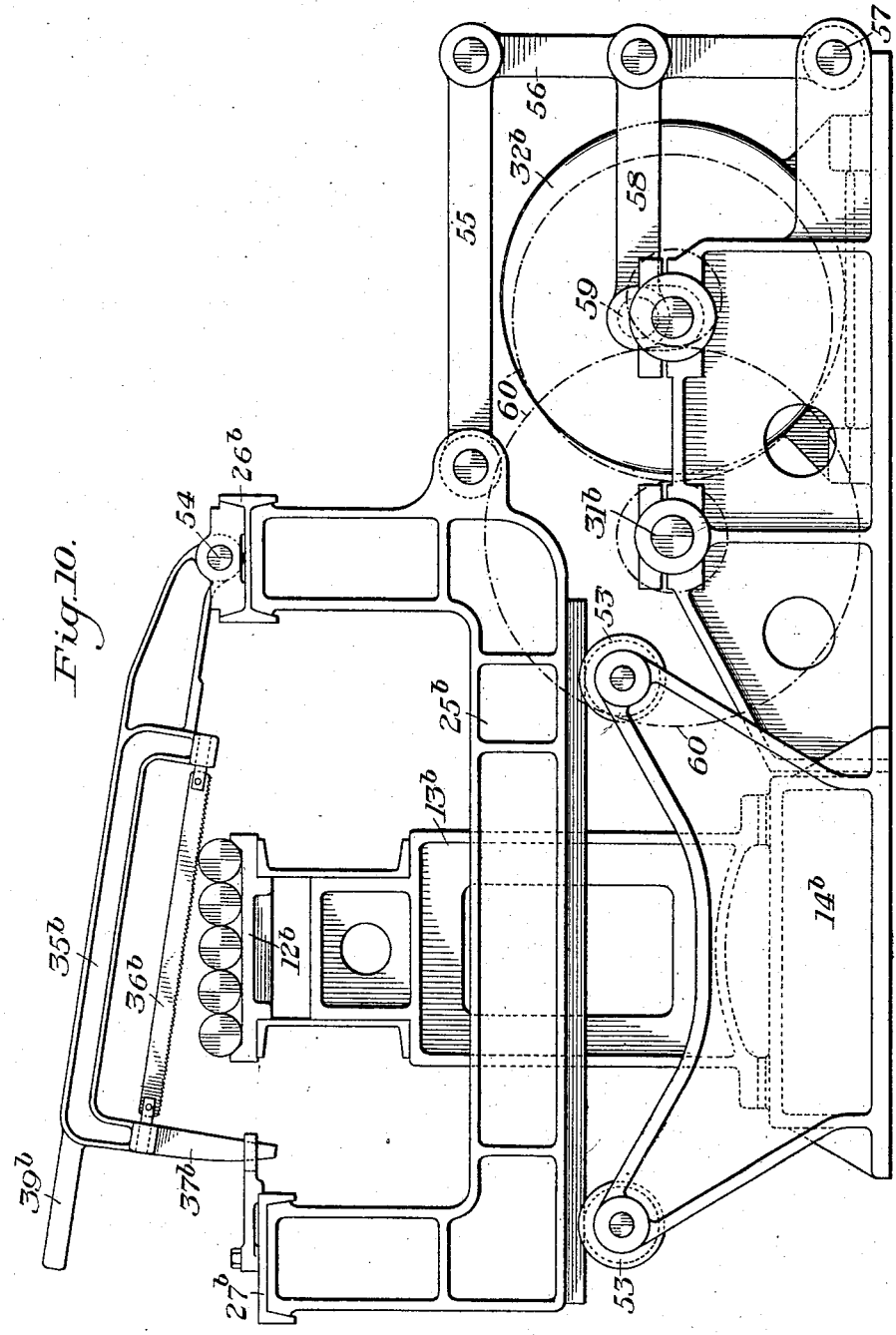

UNITED STATES PATENT OFFICE.

JOHN C. CROMWELL, OF CLEVELAND, OHIO.

GANG HACK-SAWING MACHINE.

1,186,287. Specification of Letters Patent. Patented June 6, 1916.

Application filed July 17, 1915. Serial No. 40,460.

*To all whom it may concern:*

Be it known that I, JOHN C. CROMWELL, a citizen of the United States, residing at Cleveland, in the county of Cuyahoga and State of Ohio, have invented a new and useful Improvement in Gang Hack-Sawing Machines, of which the following is a full, clear, and exact description, reference being had to the accompanying drawings, forming part of this specification, in which—

Figure 8:
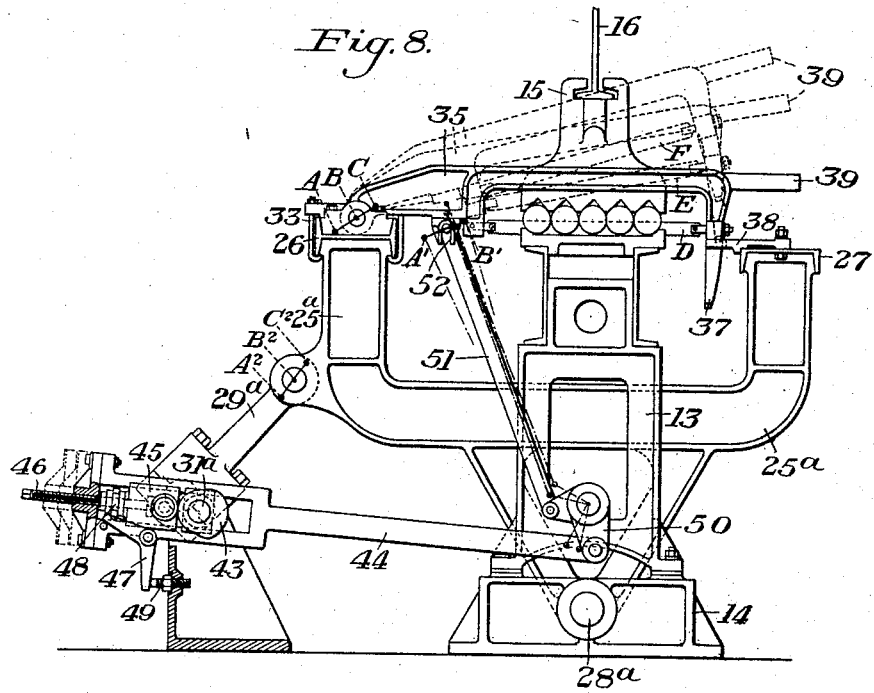
Figure 9:
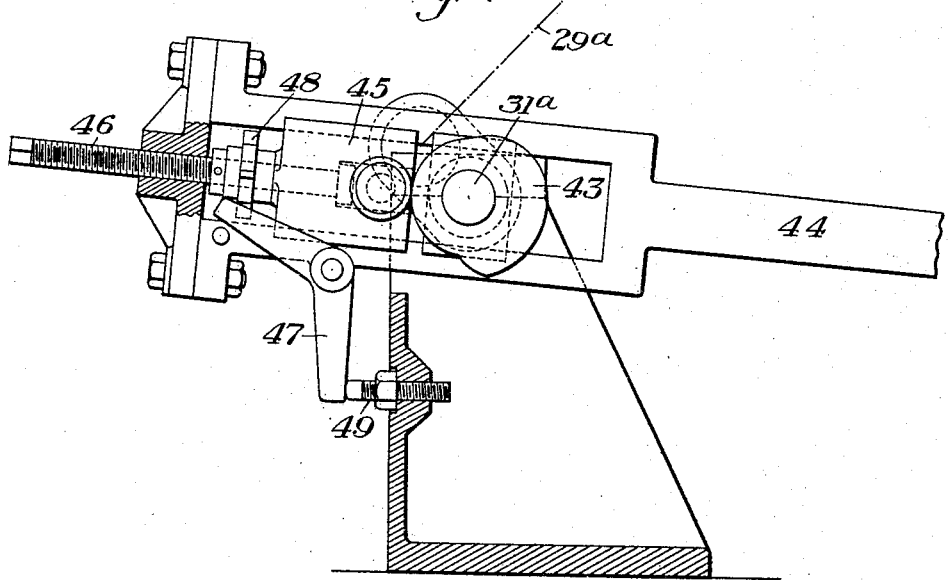

Figure 1 is a side elevation partly broken away, showing one form of apparatus constructed in accordance with my invention; Fig. 2 is a partial plan view with the superstructure removed; Fig. 3 is an enlarged end elevation; Fig. 4 is a partial view similar to Fig. 3 on a larger scale; Fig. 5 is a detail plan view of a portion of the feeding table; Fig. 6 is a cross section of the feeding table on the line VI—VI of Fig. 5; Fig. 7 is a detail view of the clamping device; Fig. 8 is an end view similar to Fig. 3, showing a modification; Fig. 9 is an enlarged detail view of the driving cam portion of Fig. 8; and Fig. 10 is a view similar to Fig. 4, but showing another modification.

My invention relates to the sawing of metal bars, etc., and is particularly adapted for sawing solid rounds into short lengths for shrapnel manufacture, although it may be used for other purposes.

The object of the invention is to provide an apparatus which will rapidly and economically saw a series of bars into a series of lengths for each bar.

Another object of the invention is to prevent the fins which are produced where rotary saws are employed.

A further object of the invention is to provide simple and rapid handling mechanism for the material; to use hack saws which are given a reciprocating and oscillating motion to avoid angular positioning of the saws during the sawing operation which would make the operation longer; to provide clamping means for preventing accidental movement of the bars while being sawed; to properly guide the saws, etc.

In the drawings, referring to the form of Figs. 1 to 7, inclusive, 2 represents the transverse supporting bars of a table on which the bars or rounds are deposited in long lengths. From the group of bars on this supporting table 2 a smaller group of, say five, are pushed sidewise on to one of the roller tables 3, of which I have shown two, one at each side of the supporting table. The smaller group of bars then rest on a series of supporting rollers 4, which are preferably provided with grooves 5, as shown in Fig. 5, to hold the bars in place during endwise travel on to the bed of the sawing machine. The bars are shoved endwise on to the sawing machine bed by any suitable means, such as a pusher 6, having a front flange 7, which contacts with the ends of the bars. This pusher slides on the side rails of the roller table, being suitably guided thereon, and is preferably actuated by a flexible connection 8, extending from a winding drum 9, over a sheave 10, and back to the pusher, to which it is attached, actuating the drum through the handles 11. The pusher may be moved forwardly to force the bars endwise from the roller table and on to the bed 12 of the sawing machine. This bed 12 is carried on separated standards 13, resting on a bed plate 14. The bed has raised side edges to prevent the bars from rolling off, and the bars are clamped thereon by overhead recessed clamping heads 15, strung on an I-beam 16. The clamping heads are longitudinally recessed on their under sides to engage the different bars of the group, and a clamping head is preferably arranged between each pair of saws, so as to positively grip the bars and prevent them from cramping or twisting during sawing. Each clamping head has a recess to loosely receive the lower flanges of this I-beam, the recess being enlarged upwardly and a spring 17 being provided to normally hold the clamping head depressed as far as it may be pushed by the spring. A floor 22$^a$ is preferably used for the clamping head operator.

The I-beam is carried by a series of cross heads 18, having an internally threaded hole engaged by a threaded shaft 19. Each cross head 18 moves between suitable guides 20, which are supported on the longitudinal beams 21. The longitudinal beams 21 are carried by cross beams 22, which rest on suitable side columns 23. The shafts 19 are provided with hand wheels 24, at their upper ends, by which the beam 16, carrying the clamping heads 15, may be raised or lowered. When raised, the springs will push the clamping heads down to the limit of movement, and when in clamping position, the springs will be compressed, the lower edges of the carrying I-beam contacting with the lower faces of the recesses in the clamping heads. Adjacent to the separated supports 13, for the clamping bed, are arranged oscillating frames 25, which are interconnected by longitudinal beams 26 and 27, at opposite sides of the bed. Each of these frames is loosely pivoted on a shaft 28, and is oscillated through the connecting rod 29, extending from a crank 30 on shaft 31. This shaft is preferably driven by an electric motor 32, through connecting gearing, such as shown in Figs. 3 and 4.

Adjustably clamped by means of the hook bolts 33 to the I-beam 26, connecting the oscillating frames, are a series of slotted bearings 34. These bearings may be adjusted to any desired intervals apart, and then secured in place. Pivoted in each bearing is a saw frame 35, extending over the bed and having a hack saw 36, removably and adjustably secured therein. The frame has at its far side a guide finger 37, which rests within a slotted or forked guide 38, secured to the channel beam 27. I preferably provide on each saw frame a projecting arm 39, on which an adjustable counter-weight 40 is secured, so as to give the requisite weight and pressure to the saw blades in their reciprocating movements. I preferably employ about sixty hack saw frames with their blades, each alternate blade being set with its teeth in reverse position to those at its side. By this arrangement, about one-half of the saws will saw in one direction of reciprocation and the other half on the return stroke, thus avoiding lifting of the saws, and sawing one set of cuts practically as fast as the other set. The slotted bearings allow the hack saw frames to move downwardly bodily as they saw through the bars, thus avoiding an annular position, which would cause the saws to cut faster through the bar at one side than through that at the other side. By thus enabling the saw blades to cut practically horizontally, the sawing proceeds at about the same rate on all the bars, thus avoiding delays.

After the sawing of the lengths from each of the groups is accomplished, I provide means for simultaneously lifting the saw frames. In the form shown, this consists of a longitudinal rail 41, carried by the pistons of the hydraulic cylinders 42, by which the rail may be raised and lowered. By admitting fluid to these cylinders, the rail is lifted, thus forcing all of the saw frames upwardly and moving the saws to a level above the cut sections. When the saws have thus been lifted, the next group of bars is shoved endwise on to the bed, this group shoving off at the far end the cut sections of the previous group.

Instead of reciprocating the saws, I may give them an orbital movement by any suitable means, such, for example, as shown in Figs. 8 and 9, which provides for lifting the saws on the return stroke. In this case, the saw blades may all be set with the teeth in the same direction. In these figures, $25^a$ represents the oscillating frames which, as before, are pivoted at $28^a$ and actuated through connecting rods $29^a$ from cranks on the main shaft $31^a$. In this case, the main shaft also has eccentrics 43, which actuate eccentric rods 44, through adjustable contact blocks 45. These contact blocks are adjusted by screws 46. The contact blocks are automatically adjusted during the sawing by pivoted pawl 47, actuating ratchet wheel 48. The lower end of the pawl contacts with an adjustable screw 49. The connecting rod 44 actuates a bell crank 50, which has a link 51 entering a slotted bearing 52 on the saw frame.

As the saws cut through the bars, the feed motion operating through the ratchet and feed screw is given a movement substantially equal to the cutting progress of the saws. This makes the lift of the saws nearly uniform for all positions. As the link connection to the saw frame is slotted, the saws are not forced down, but act by their own weight, as in the first form. When the saws have cut through a set of bars, the feed pawls are to be thrown out and the saws returned to their original position by applying a crank to the feed screw 46. In these figures, A, B and C indicate the stroke of the saws, A′, B′ the motion to relieve the saw blades, and D, E and F the position of the saw blades at the finish of the cut, the beginning of the cut and at the lifted position for placing the bars on the table. In this form, no hydraulic lifting device need be used, as the mechanism shown will take the place thereof.

In Fig. 10, I have shown another modification, in which the carrier for the saw-frames is mounted for straight line back and forth movement on the roller supports 53. This carrier is in general similar to that shown in Figs. 3 and 4, and similar reference numerals have been applied to corresponding parts with the exponent "b" added thereto. The saw frames are, however, pivoted at 54, so that the cutting edge is angled with respect to the work. For reciprocating the carrier, I have shown the pitman 55, connected to a lever arm 56, pivoted at 57, and having a connection 58 with a crank pin 59 driven by gears 60 from the shaft $31^b$. By the term "reciprocating", as used in the claims, I intend to cover both the right line reciprocation shown in this modification and also the oscillating reciprocation shown in the other forms.

The advantages of my invention will be obvious to those skilled in the art, since a rapid, simple and efficient apparatus is provided by which a series of cuts may be given by a gang of hack saws to a series of bars. The spacing of the hack saws may be quickly and easily changed by changing the spaces between them, as they are simply strung on the actuating beam. Similarly, the clamping heads may be spaced at any desirable distance apart on their supporting I-beam. The springs will hold the clamping heads wherever they are set. As compared to rotary saws, the gang saws will leave no fins, which are objectionable as requiring grinding, which occasions loss of material; and the cuts may be thinner, thus avoiding waste of material. The feeding of the stock on to the bed and the clamping may be carried out through the mechanism shown, and the operation may proceed rapidly and economically.

I prefer to use these machines in pairs, as shown in Fig. 2, with the supporting table between, so that the bars may be pushed either way in small groups on either one of the tables. This, however, may or may not be used, as desired.

Many changes may be made in the feeding apparatus, clamping apparatus, the actuating mechanism, etc., without departing from the scope of the appended claims.

I claim:

1. In sawing apparatus, a gang of separated hack saws, a stationary bed plate below the hack-saws for supporting the pieces to be cut, clamping devices between some of the saws coacting with the bed plate for holding said pieces from movement, and means for actuating said hack saws, substantially as described.

2. In sawing apparatus, a gang of hack saws, separated frames for said saws, a common movable member to which the saw frames are connected, and means for actuating said member to actuate the hack saws, substantially as described.

3. In sawing apparatus, a gang of hack saws, separated frames for said saws, a common movable member to which the saw frames are connected, and means for actuating said member to actuate the hack saws, the hack saw frames being adjustable along said actuating member, substantially as described.

4. In sawing apparatus, a gang of hack saws, a stationary receiving bed for the bars, and clamping devices between some of the saws arranged to clamp a series of bars to be sawed simultaneously, substantially as described.

5. In sawing apparatus, a gang of hack saws, a stationary receiving bed for the bars, and clamping devices between some of the saws arranged to clamp a series of bars to be sawed simultaneously, at least some of said clamping devices being located between the saws, substantially as described.

6. In sawing apparatus, a gang of hack saws, separated frames for the saws, a common member to which the saw frames are connected, supports for said member, and connections for reciprocating said member, substantially as described.

7. In sawing apparatus, a series of separated standards supporting a bed, reciprocating members between said supports, connections for reciprocating said members, and a gang of hack saws connected to the reciprocating members, substantially as described.

8. In sawing apparatus, a series of separated standards supporting a bed, reciprocating members between said supports, connections for reciprocating said members, and a gang of hack saws connected to the said members and arranged to feed downwardly by gravity, substantially as described.

9. In sawing apparatus, a series of separated standards supporting a bed, movable members between said supports, connections for moving said members, and a gang of hack saws connected to the said members and arranged to feed downwardly by gravity, substantially as described.

10. In sawing apparatus, a series of separated standards, a longitudinal bed supported thereon, movable members between the supports, hack saw frames connected to one side of the supports, and guides for the hack saw frames connected to the other side of said supports, substantially as described.

11. In sawing apparatus, a series of separated standards, a longitudinal bed supported thereon, movable members between the supports, hack saw frames connected to one side of the supports, and guides for the hack saw frames connected to the other side of said supports, said saw frames and guides being adjustable lengthwise of the bed, substantially as described.

12. In sawing apparatus, a gang of hack saws, separated frames for the saws, a common longitudinal member to which the saw frames are adjustably connected, and longitudinally adjustable guides for the outer ends of the saw frames, substantially as described.

13. In sawing apparatus, a gang of separated hack saw frames, a saw in each frame, a supporting bed, and overhead clamping devices between some of the saws, substantially as described.

14. In sawing apparatus, a gang of hack saws, mechanism for actuating the same, a table at the end of the sawing apparatus, and mechanism for shoving the bars endwise from said table on the saw bed, substantially as described.

15. In sawing apparatus, a bed for a group of bars, a table at the side thereof arranged to receive a smaller group, a saw bed in longitudinal alinement with the table, a gang of hack saws above said bed, and mechanism for actuating the same, substantially as described.

In testimony whereof, I have hereunto set my hand.

JOHN C. CROMWELL.

Witnesses:
  HENRY J. GRUSS,
  GRACE L. JONES.

Copies of this patent may be obtained for five cents each, by addressing the "Commissioner of Patents, Washington, D. C."